United States Patent Office 3,843,482
Patented Oct. 22, 1974

3,843,482
TIRE TREAD WINDING MACHINE HAVING A MECHANICALLY PROGRAMMED CONTROL SYSTEM
Jack Wireman, Yorba Linda, and Leslie A. Kosla, Mission Viejo, Calif., assignors to AMF Incorporated, White Plains, N.Y.
Filed May 1, 1973, Ser. No. 356,202
Claims priority application Great Britain, May 3 1972, 20,499/72
Int. Cl. B23d 31/00; B29h 17/00, 17/02
U.S. Cl. 156—350                   21 Claims

ABSTRACT OF THE DISCLOSURE

An automatic tire building machine for applying an elastomeric ribbon to a tire casing comprising means for rotating the casing in its plane and an azimuth column rotatable around an axis parallel to such plane, such column carrying ribbon application and stitching rollers for applying and stitching the ribbon to the casing as it is fed to the applying rollers from a ribbon extruder. The azimuth position of the column is controlled by a hydraulic piston and cylinder assembly which is actuated by a mechanical programmer having camming members, such as lugs or bars, which actuate a hydraulic valve connected to the piston and cylinder assembly. The camming members are adjustable and are movable by a drive actuated with each revolution of the casing so that the valve is actuated by successive camming members. The azimuth column and the programmer are mounted on a carriage which is movable toward and away from the casing.

This invention relates to a machine for winding an elastomeric ribbon on the outer surface of a green casing in the course of its original manufacture or on a used, buffed pneumatic tire casing for retreading or recapping such casing.

The invention relates to apparatus of the type disclosed in U.S. Pats. Nos. 3,251,722 and 3,308,000 and to the application of an elastomeric ribbon to a tire casing in a manner similar to the manner, and for the purposes, described in said patents. As disclosed therein, a plurality of overlapping layers of an elastomeric ribbon or tape, such as an extruded tape of unvulcanized rubber, are wrapped around and stitched to the casing and/or to each other as the casing is rotated to form the tread portion of the completed tire. In the apparatus of both said patents, the tire casing is rotated in a vertical plane and is mounted on an azimuth column which causes movement of the casing around a vertical axis to permit successive layers of the tape to be laid on the casing in different positions. The application of the tape to the casing in said apparatus of said patents is controlled either by an electronic programmer or a punched tape programmer.

It has been found to be advantageous from the standpoint of reliability and simplicity to control relative azimuth movement of a tire casing and the ribbon applicator by a mechanical, rather than an electronic or punched tape, programmer.

It has also been found that it is preferable and advantageous not only from the mechanical standpoint, but also from the operation standpoint, to not move the tire casing around a vertical axis, particularly if it is rotated at high speed, and instead, to move the tape or ribbon application and stitching rollers in the azimuth direction.

It is one object of this invention to provide a mechanical programmer for a ribbon winding machine, which is used for winding an elastomeric ribbon on a tire casing, the programmer automatically controlling the operation of the machine, such programmer comprising a plurality of camming members, such as lugs or bars, the positions of the camming members determining the path followed by the ribbon on the tire casing and the thickness of the variable thickness elastomeric layer deposited on the casing by winding the ribbon around the casing.

It is also an object of this invention to provide a machine of the above type which continuously rotates, or spins, the tire casing around its spin, or normal rotational axis during the application of the elastomeric ribbon, and produces a relative transverse, or azimuth movement of the elastomeric ribbon applying apparatus during the application of the ribbon to the casing, the azimuth movement being a start-stop movement, the magnitude of the azimuth movement for each spin revolution being controlled by the mechanical programmer and the positions of the camming members thereof determining the amount of the azimuth movement for each spin revolution, and, in this manner, the pattern wound on the casing.

It is also an object of this invention to provide the machine of the above type in which the azimuth movement of the ribbon applying apparatus is produced by means of a fluid-operated actuator which makes the ribbon, being wound on the casing, follow a composite spiral having a zero pitch portion when there is no azimuth movement and a constant pitch for the intervals of time when there is an azimuth movement, the azimuth movement starting at a fixed spin position of the casing and continuing for a fraction of the spin revolution, this fraction being determined by the programmer and the desired thickness of the variable thickness elastomeric layer to be deposited on the casing being determined by the amount of the azimuth movement for each spin revolution.

Other objects and advantages of the invention will be apparent from the following detailed description of the preferred embodiments thereof, which description should be considered in conjunction with the accompanying drawings, in which.

Figure 1:
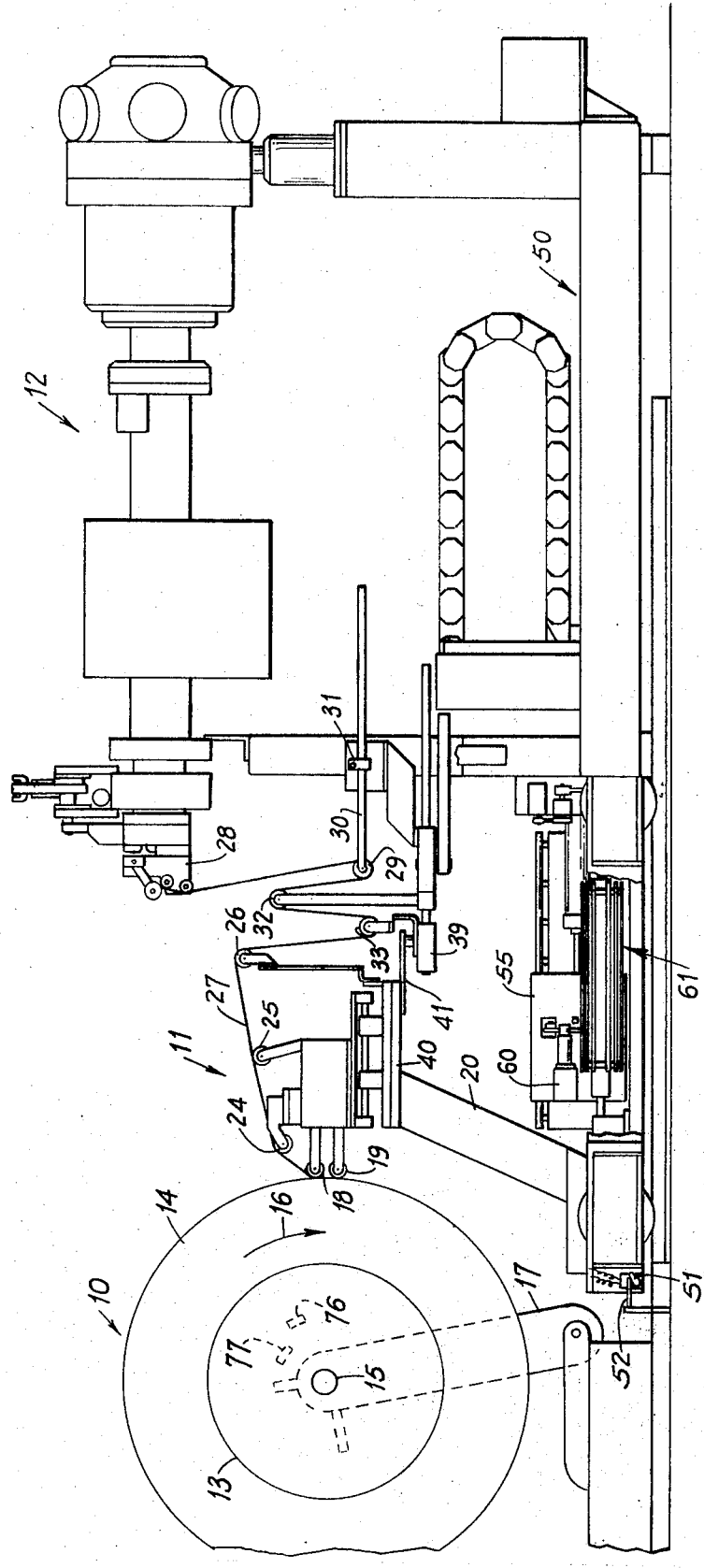
FIG. 1 is a side elevation of one embodiment of the apparatus of the invention.
Figure 2:
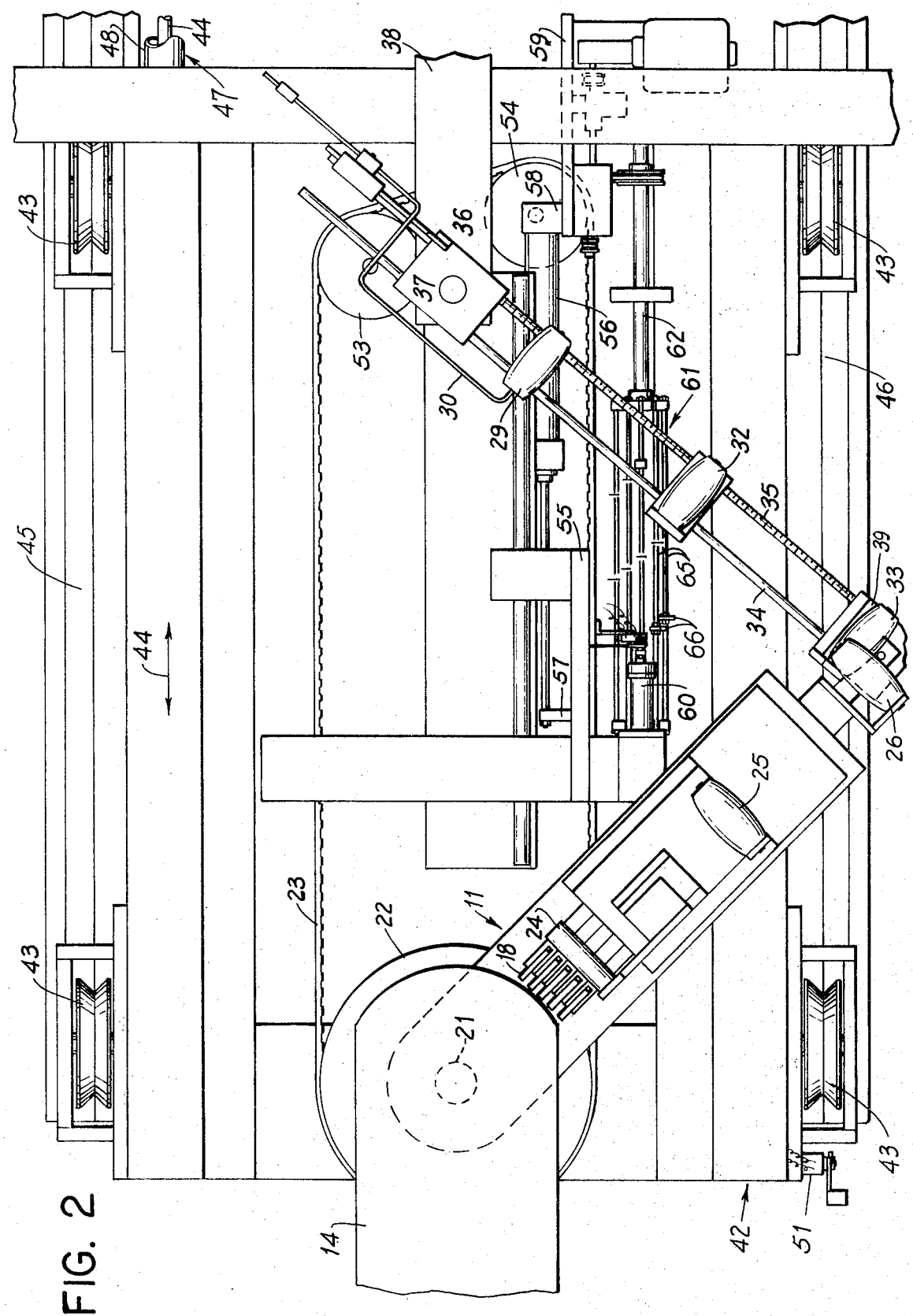
FIG. 2 is a plan view of the apparatus shown in FIG. 1 with certain portions thereof omitted for ease of illustration.
Figure 3:
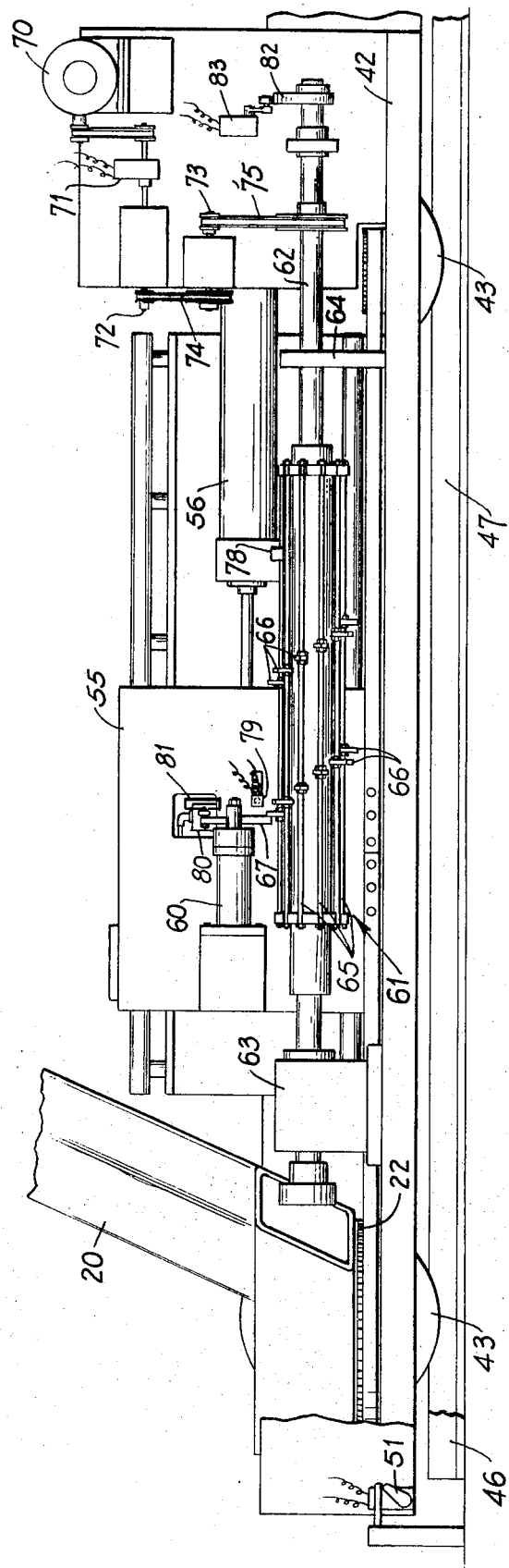
FIG. 3 is an enlarged, side elevation view of a portion of the apparatus shown in FIGS. 1 and 2.

The apparatus illustrated in FIGS. 1-3 comprises a tire casting rotating section 10, an elastomeric ribbon applying section 11 and a conventional elastomeric ribbon extruding section 12. The tire casing rotating section 10 comprises a wheel 13 supporting the tire casing 14 and mounted for rotation around the axis of a driven shaft 15, which rotates the wheel 13 and the casing 14 in the direction indicated by the arrow 16. The shaft 15 may be driven in any conventional manner, such as by a chain drive 17 driven by a conventional electric motor and gear reduction train (not shown).

The ribbon applying section 11 comprises application rollers 18 and stitching rollers 19 mounted on an azimuth column 20 which is rotatable around the axis of a shaft 21 by means of a toothed pulley 22 driven by a toothed timing belt 23, as described hereinafter. Preferably, the rollers 18 and 19 have fluid actuators (not shown) associated therewith in a known manner to permit movement thereof toward and away from the casing 14 and thereby to permit manual variation of the application and stitching pressures.

The ribbon applying section 11 also comprises a plurality of freely rotatable, guiding rollers 24, 25 and 26 also mounted from the azimuth column 20, and such rollers 24–26 serve to guide the elastomeric ribbon 27 to the application rollers 18.

The ribbon 27 is extruded in any well-known manner from the die 28 of the extruder section 12 and passes around a roller 29 rotatably mounted on a dancer arm 30 which is pivotally mounted on a support 31 and serves to take up slack in the ribbon 27 as it passes from the die 28 to the ribbon applying section. From the roller 29, the ribbon 27 passes to a pair of rollers 32 and 33 which are mounted on a pair of rods 34 and 35 (FIG. 3) and which are supported near one end by a block 36 which is pivotally mounted on a vertical shaft 37 supported from the frame member 38 so as to permit movement of the rods 34 and 35 around the axis of the shaft 37. Both rods 34 and 35 are slidably received by the block 36 so as to permit longitudinal movement thereof. Preferably, one of the rods 34 and 35 is a threaded rod, which is in threaded engagement with the support for the roller 32 so as to permit adjustment of the spacing between the roller 32 and the rollers 29 and 33 by rotation of the rod 35. The rods 34 and 35 are supported at their ends after in greater detail, actuates the piston and cylinder thereto and which is connected to a plate 40 at the top of the azimuth column 20 by a bracket 41 which is pivotally connected to the member 39.

The azimuth column 20 is mounted on a carriage 42 which is mounted on wheels 43 permitting movement of the carriage 42 in the directions indicated by the arrow 44 in FIG. 2, the wheels 43 riding on tracks 45 and 46. Movement of the carriage 42 is caused by a hydraulic piston and cylinder assembly 47, having the cylinder portion 48 thereof secured in any desired manner to the carriage 42, and having the rod portion 49 thereof secured to a fixed point, such as the stationary frame 50 of the apparatus.

FIGS. 1–3 show the carriage 42 in its forward position, i.e., the position assumed thereby when the ribbon 27 is being applied to the surface of the casing 14. FIG. 2 illustrates the ribbon applying apparatus and the azimuth column 20 in their "home" azimuth positions, i.e., the azimuth position when the ribbon 27 is not being applied to the casing 14. During the time that the casing 14 is being loaded or unloaded on the mandrel carried by the shaft 15, the carriage 42 is moved to the right, as viewed in FIG. 2, a distance sufficient to permit such loading or unloading of the casing 14. The carriage 42 is moved into the position shown in FIGS. 1–3 by manual operation of a carriage extend button which, as described hereinafter in greater detail, actuates the pitson and cylinder assembly 47, causing the carriage 42 to move to the left as viewed in FIG. 2 until the limit switch 51 carried thereby is actuated by the stop 52 which is mounted on the stationary frame of the apparatus. When the limit switch 51 is actuated, the piston and cylinder assembly 47 is hydraulically locked and at the same time the azimuth column 20 is rotated clockwise as viewed in FIG. 2 by a few degrees, e.g., 15–30°, to a "start" position, in which the process of applying the ribbon 27 to the casing 14 can be commenced.

The timing belt 23, in addition to extending around the pulley 21 which controls the position of the azimuth column 20, extends around a pair of idler pulleys 53 and 54 rotatably mounted on the carriage 42, and is fastened to a plate 55 slidably mounted on the carriage 42. The position of the plate 55 is controlled by a hydraulic piston and cylinder assembly 56, one end of which is secured to a bracket 57 extending from the plate 55, and the other end of which is secured to a bracket 58 mounted on the bracket 59 extending from the carriage 42. Operation of the piston and cylinder assembly 56 is controlled by a hydraulic servo valve 60 mounted from the support for the plate 55 so that the servo valve 60 moves with the plate 55. The position of the servo valve 60, and hence the actuation of the piston and cylinder assembly 56, is controlled by a logic drum 61 which is rotatable by a shaft 62, the shaft 62 being rotatably mounted on the carriage 42 by a pair of brackets 63 and 64. The logic drum 61 comprises a plurality of rods 65 extending parallel to the axis of the shaft 62 and spaced radially from the axis of the shaft 62. Each rod 65 has a plurality of lugs 66 thereon which are adjustable both circumferentially and axially to the rod 65. The servo valve 60 has an actuator 67 which is engageable with the lugs 66, and when the actuator 67 is out of engagement with a lug 66, the servo valve 60 admits fluid under pressure to the piston and cylinder assembly 56 at the end thereof which causes the plate 55 to move to the right as viewed in FIGS. 2 and 3. When the actuator 67 has been moved by virtue of engagement of the actuator 67 with a lug 66, the servo valve 60 cuts off hydraulic fluid flow to and from the piston and cylinder assembly 56 thereby locking the plate 55 in a fixed position relative to the carriage 42. It will be noted that as the sliding plate 55 moves, it causes movement of the timing belt 23 and azimuth rotation of the azimuth column 20. Accordingly, the amount of rotation of the azimuth column 20 is dependent upon the longitudinal spacing between lugs 66 on circumferentially successive rods 65 of the logic drum 61, the spacing of such lugs 66 being adjustable by movement thereof longitudinally of the rod 65.

The shaft 62, and hence the logic drum 61, is rotated by an electric motor 70 mounted on the carriage 42, which is connected to the shaft 62 through a single revolution solenoid clutch 71, a pair of shafts 72 and 73 and a pair of speed reducing, sprocket and chain drives 74 and 75.

The rotating apparatus for the tire casing 14 comprising a pair of switches 76 and 77 (FIG. 1) which are actuated each time that the casing 14 makes one revolution, the switch 76 being identified as an advance switch. When the operator presses the extend button, as described hereinbefore, the casing 14 is rotated by the shaft 15 until the switch 77 is operated, at which time rotation of the casing 14 stops. Each time that the advance switch 76 is actuated it energizes the single revolution clutch 71 causing the shaft 62 to rotate through an angle equal to the angle between the rods 65, so that the rod 65, previously having the lug 66 in engagement with the actuator 67, is replaced by the next succeeding rod 65. When the actuator 67 is released by the lug 66 due to rotation of the logic drum 61, the piston and cylinder assembly 56 is actuated causing the plate 55 to move to the right as viewed in FIG. 3, and when the plate 55 has moved a distance sufficient to cause the actuator 67 to engage and be moved sufficiently by the lug 66 of a succeeding rod 65, movement of the plate 55, and hence rotatation of the azimuth column 20, is stopped, as described hereinbefore. The logic drum 61 may, for example, have ten rods 65 equally ditributed therearound so that the logic drum 61 make one-tenth of a revolution each time that the switch 76 and the solenoid clutch 71 are actuated.

It will be apparent that the number of steps of rotation of the azimuth column 20 is dependent upon the number of lugs 66 on the rods 65, and that, in effect, the actuator 67 "steps" from one lug 66 to another. Although only a two-turn spiral of the lugs 66 has been shown in the drawings, it will be apparent that a greater or lesser number of lugs 66 may be used.

At the last lug 66, i.e., the lug which completes the azimuth rotation of the azimuth column 20, there is a permanent magnet 78 which is positioned so that a reed switch 79 mounted on the plate 55 is actuated when the magnet 78 is thereadjacent. It will be observed that the sliding plate 55 moves stepwise to the right as viewed in FIG. 3, until the reed switch 79 is immediately above the magnet 78. Actuation of the reed switch 79 is used to stop the rotation of the casing 14 and extrusion of the ribbon 27 by the extruder section 12. The operator then presses a reset button which operates an air cylinder 80 connected to the actuator 67 causing such actuator 67 to rotate out of contact with the last lug 66 and into a position in which it can clear the lugs 66 as the plate 55 is returned to its initial or "home" position to the left as viewed in FIG. 3. When the actuator 67 is rotated by the air cylinder 80, the upper end thereof, as viewed in FIG. 3, engages a cam 81 which moves the actuator 67 to the left causing the servo valve 60 to permit fluid under pressure to enter the piston and cylinder assembly 56 to move the plate 55 to the left to its "home" position, as viewed in FIG. 3. It will be noted that as the plate 55 returns to its "home" position, it drives the belt 23 thereby returning the azimuth column 20 and its associated ribbon applying apparatus to their "home" positions.

Actuation of the reset button by the operator as aforesaid also continuously energizes the solenoid clutch 71 causing the shaft 62 to rotate until the cam 82 actuates a switch 83 at which time energization of the solenoid clutch 71 is interrupted and the logic drum 61 is at its "home" position. Accordingly, all of the parts of the ribbon applying apparatus and the controls therefor are returned to positions such that the apparatus is ready for the next ribbon application cycle.

Assuming that all of the parts are in their "home" positions and that the carriage 42 is in its retracted position, i.e., to its position furthest to the right as viewed in FIG. 1, the operation of the apparatus illustrated in FIGS. 1–3 is as follows:

(1) The operator loads a casing 14 with its wheel 13 on the mandrel carried by the shaft 15.

(2) The operator presses a manual carriage extend button which, if the casing 14 is not in a position in which the switch 77 is actuated, will cause the casing 14 to rotate until the switch 77 is actuated, and which will cause operation of the piston and cylinder assembly 47 to move the carriage 42 to the left, as viewed in FIG. 1, until the limit switch 51 is actuated.

(3) When the carriage 42 is in the extended position and the switch 51 has been actuated, the piston and cylinder assembly 56 is actuated causing the plate 55 to move to the right as viewed in FIG. 3 until the actuator 67 engages a lug 66 on the rod 65 immediately therebelow. As the plate 55 moves it rotates the azimuth column 20 by means of the timing belt 23 to its "start" position.

(4) The operator then turns on the extruder causing the ribbon 27 to be emitted from the die 28 and the operator strings the strip of ribbon 27 around the rollers 29, 32, 33, 26, 25 and 24 placing the end thereof between the application rollers 18 and the casing 14.

(5) The operator then presses a manual start switch which causes the casing 14 to rotate in the direction indicated by the arrow 16, and causes the extruder section 12 to continue to extrude the ribbon 27. As the casing 14 rotates, the ribbon 27 is applied thereto by the application rollers 18 and is stitched by the stitching rollers 19.

(6) During most of the first revolution of the casing 14, the azimuth column 20 maintains a fixed position, but when the switch 76 is actuated the logic drum 61 is rotated as described hereinbefore causing the azimuth column 20 to rotate by an amount determined by the longitudinal spacing between the lugs 66 on successive rods 65. Such movement of the azimuth column 20 causes the next layer of ribbon 27 applied to the casing 14 to be displaced transversely of the casing 14 with respect to the first layer thereof, the amount of displacement being determined by the amount of rotation of the azimuth column 20.

(7) The application of the ribbon 27 to the casing 14 is continued as described hereinbefore until the magnet 78 on the logic drum 61 operates the reed switch 79, at which time extrusion of the ribbon 27 from the extruder section 12 and rotation of the casing 14 are stopped. In addition, the plate 55 and the logic drum 61 automatically return to their "home" positions.

(8) The operator then cuts the ribbon 27 at the application rollers 18 and, if desired, moves the ribbon 27 from intermediate the application rollers 18 to the die 28.

(9) The operator then presses a manual retract button which actuates the piston and cylinder assembly 47 causing the carriage 42 to retract to a "home" position, and thereafter the operator removes the casing 14 to which the desired amount of elastomeric ribbon has been applied from the mandrel on the shaft 15. At this point the apparatus is ready for the mounting of another casing 14 on the mandrel of the shaft 15 and repetition of the operations described hereinbefore.

Figure 4:
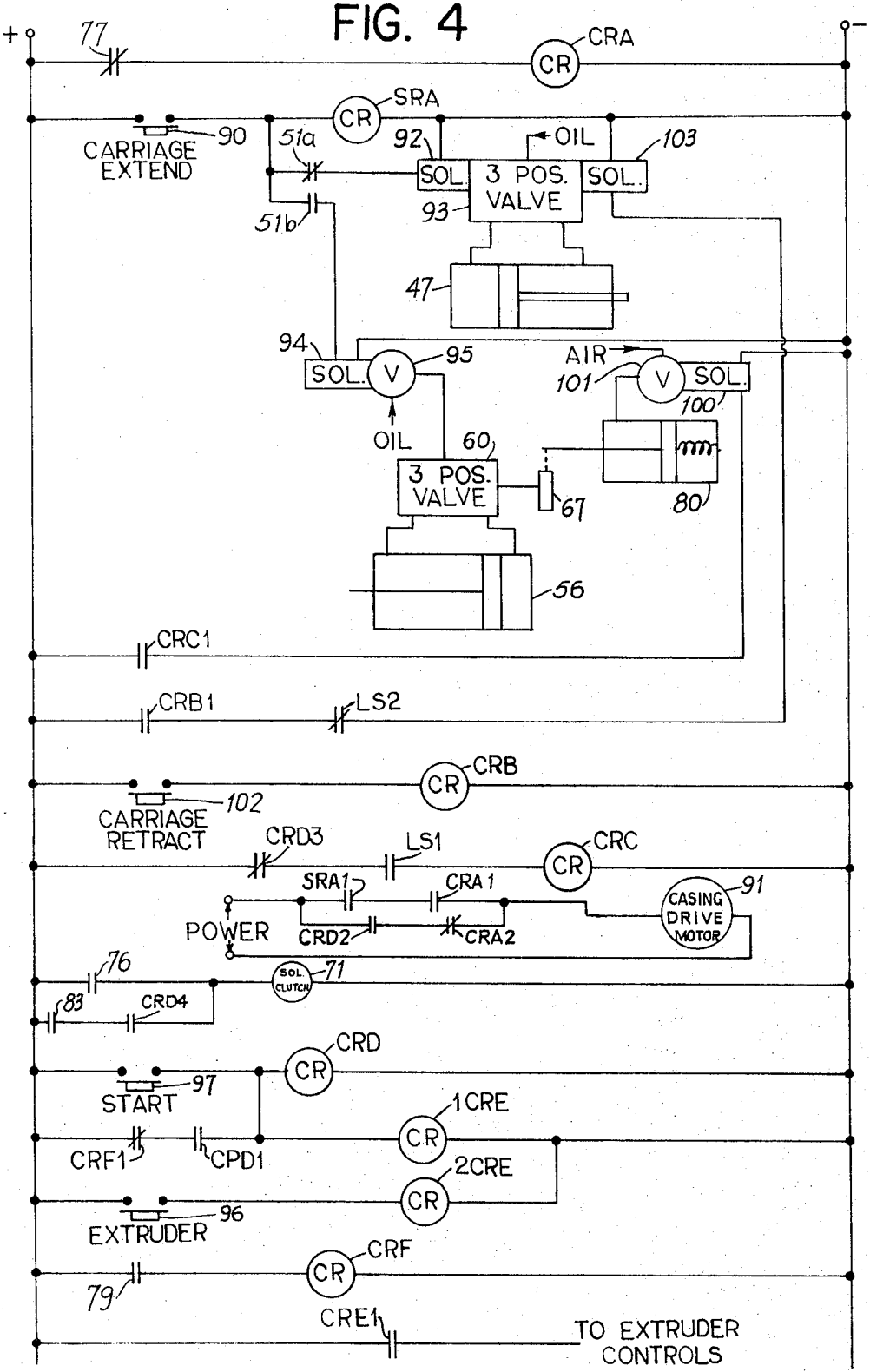
FIG. 4 is a combined, simplified, schematic diagram of the electrical and fluid controls for the apparatus illustrated in FIGS. 1-3.

FIG. 4 is a combined, simplified schematic diagram of the electrical and fluid controls for the apparatus shown in FIGS. 1–3, which is sufficient to indicate to those skilled in the art the co-operation of the controls, but which omits refinements, such as hold circuits, etc., which those skilled in the art may wish to include in a commercial embodiment of the invention.

With reference to FIG. 4, and assuming that the various parts are in their "home" positions, the diagram of FIG. 4 may be understood from the following description:

(1) When the operator presses the carriage extend button 90, slow release control relay SRA closes its contacts SRA1. If switch 77 (FIGS. 1 and 4) is closed indicating that the casing 14 is not in its start position, the contacts CRA1 of control relay CRA will be closed and the casing driving motor 91 will be energized. When the casing 14 is in its start position, switch 77 will open, de-energizing the motor 91.

(2) Closure of the contacts of extent button 90 will also energize the solenoid 92 of the three-position valve 92 through the closed contacts of the limit switch 51a (FIGS. 1 and 4), which will cause the piston and cylinder assembly 47 (FIG. 2) to move the carriage 42 to its extended position, at which position the contacts 51a will open, stopping the carriage 42, and contacts 51b will close energizing solenoid 94 of valve 95 which supplies oil under pressure to the three-position valve 60 (FIGS. 1 and 3). If the actuator 67 (FIG. 3) is not moved to a neutral position by a lug 66, the piston and cylinder assembly 56 (FIG. 3) will move the plate 55 until the actuator 67 is so moved, movement of the plate 55 causing movement of the azimuth column 20 to its start position.

(3) When the operator desires to obtain the ribbon 27 for stringing the guide rollers, he presses the extruder button 96 which operates the control relay CRE through the coil 2CRE thereof, which, by the contacts CRE1, cause operation of the extruder section 12.

(4) When the end of the ribbon 27 has been placed between the application rollers 18 and the casing 14, the operator presses the start button 97 which energizes the control relay CRD which locks up through its contacts CRD1 and the normally closed contacts CRF1. Contacts CRD2 in series with closed contacts CRA2 energize the drive motor 91 for the casing 14. The start button 97 also energizes the coil 1CRE of the control relay CRE causing operation of the extruder section 12.

(5) With each revolution of the casing 14, the switch 76 (FIGS. 1 and 4) is closed, energizing the solenoid clutch 71 (FIGS. 3 and 4), which, as described hereinbefore, rotates the logic drum 61 by one-tenth of a revolution.

(6) As the logic drum 61 rotates, the azimuth column 20 is stepped by the piston and cylinder assembly 56, as described hereinbefore.

(7) When the reed switch 79 closes, control relay CRF is energized which opens the locking circuit for the relay CRD and de-energizes the coil 1CRE which de-energizes the drive motor 91, through CRD2 and de-energizes the extruder section 12 through CRE1.

(8) Release of the relay CRD also energizes the relay CRC through contacts CRD3 and the limit switch LS1 which is closed when the plate 55 is away from its home position, but which opens when the plate 55 reaches its home position. Contacts CRC1 energize solenoid 100 of valve 101, which operates self-returning air cylinder 80 which, by actuation of the actuator 67, returns the plate 55 to its home position and releases relay CRC through the limit switch LS1.

(9) Closure of the contacts CRD4 by the release of the relay CRD energizes the solenoid clutch 71 through the switch 83, which is closed when the logic drum 61 is away from its home position, and causes the drum 61 to rotate until it reaches its home position and switch 83 opens.

(10) When the operator presses retract button 102, relay CRB is energized, closing its contacts CRB1, which through the limit switch LS2, which is closed when the carriage 42 is away from its home position and vice versa, energizes the solenoid 103 of the valve 93 causing the piston and cylinder assembly 47 to move the carriage 42 to its home position at which time the limit switch LS2 opens, de-energizing the solenoid 103.

Figure 5:
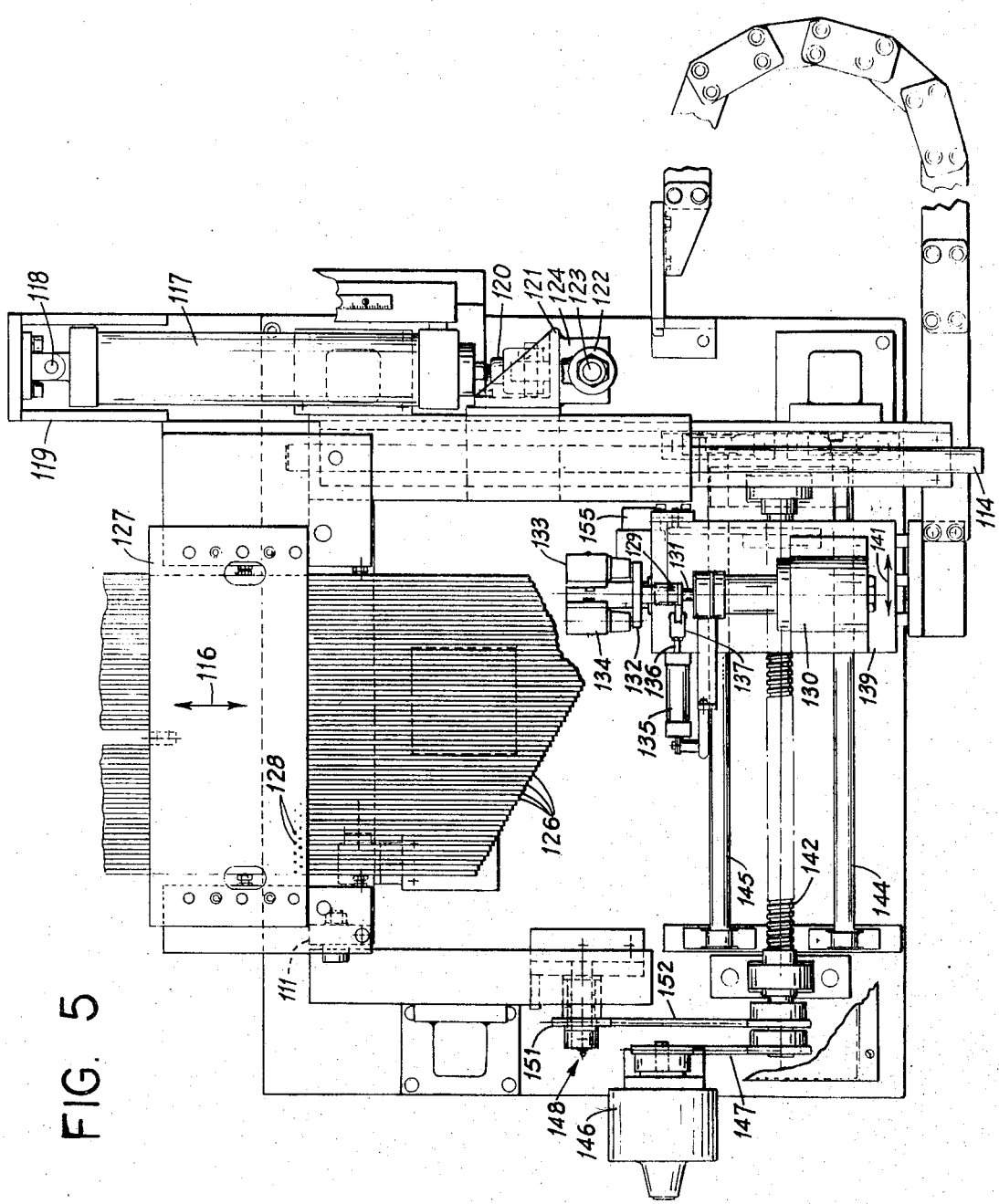
FIGS. 5, 6 and 7 are, respectively, plan, front elevation and side elevation views of an alternative embodiment of the mechanical programmer.
Figure 6:
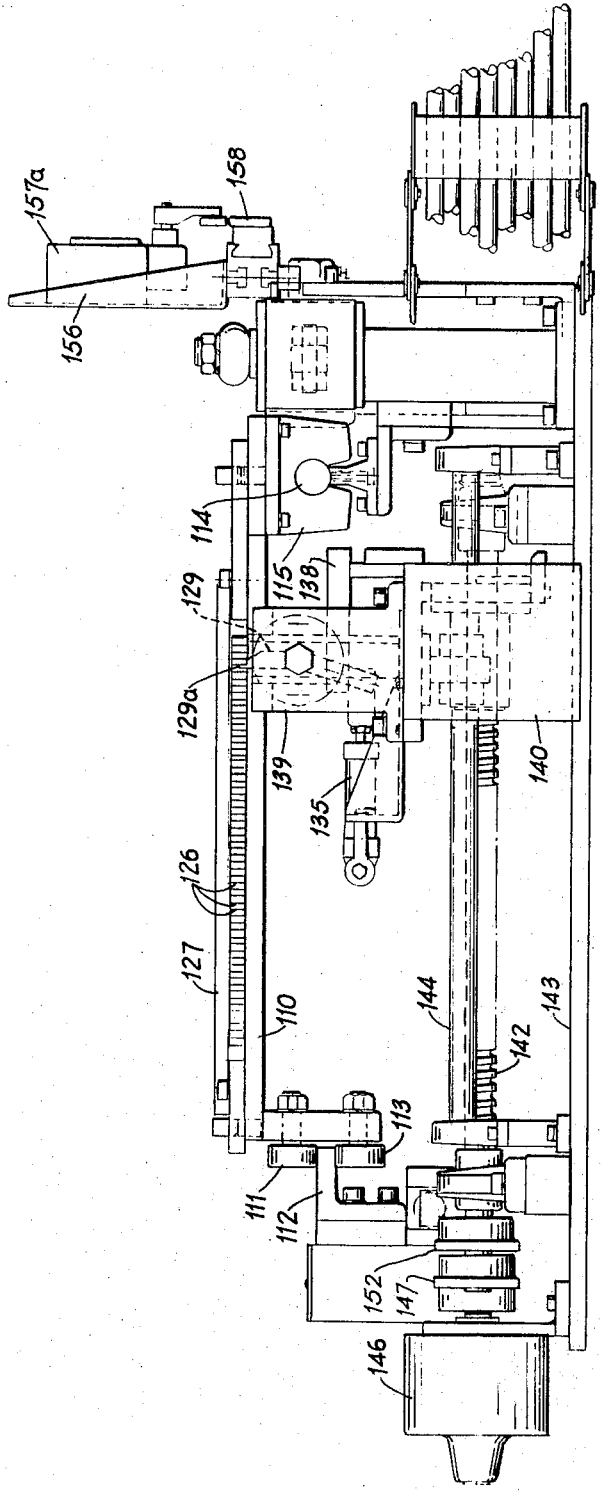
Figure 7:
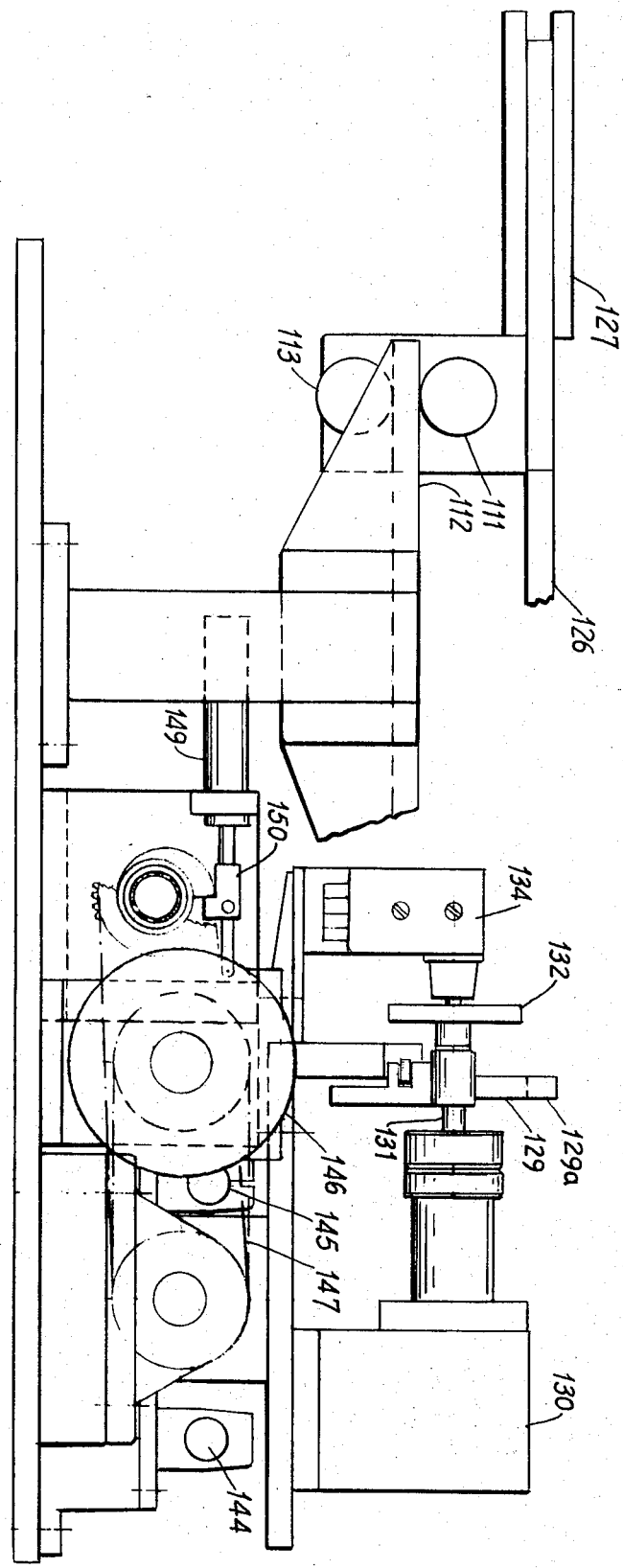

An alternative form of the mechanical programmer for controlling the azimuth column 20 and which may be substituted for the logic drum 61 and its associated apparatus, is illustrated in FIGS. 5–7.

With reference to FIGS. 5 and 6, a plate 110, supported at one end by a roller 111 riding on a track 112 and guided by a roller 113 engaging the underside of the track 112 is supported at the opposite end of a slide 114 engaging a bracket 115 secured to the plate 110. The plate 110 is movable in the directions indicated by a double-ended arrow 116 by means of a hydraulic piston and cylinder assembly 117. The cylinder of the assembly 117 is pivotally mounted at 118 on a stationary frame member 119, and the piston rod 120 of the assembly 117 is connected to a bracket 121 secured in any suitable manner to the plate 110. A clevis 122 is pivotally connected at 123 to a bracket 124 extending from the bracket 121, the clevis 122 forming part of a link 125 (FIG. 8) which connects the mechanical programmer to the azimuth column 20 as described hereinafter.

The plate 110 supports a plurality of bars 126, such bars being held between the plate 110 and a cover plate 127. The bars 126 may, for example, be steel bars approximetaly ³⁄₁₆ inch wide and ½ inch high, as viewed in cross-section, and there may, for example, be approximately sixty of such bars 126 which would permit adjustment of the azimuth column 20 in sixty steps. Each of the bars 126 is held in place by a set-screw 128, extending through the cover plate 127 and threaded therein. Thus, by loosening a set-screw 128 the bar 126 associated therewith may be adjusted longitudinally thereof, and the bars 126 may be adjusted so that their ends are in the stepped configuration illustrated in FIG. 5. It will be apparent from the foregoing that as hydraulic fluid is admitted into one end of the piston and cylinder assembly 117, the plate 110, and hence the bars 126, will move toward the bottom of the sheet of drawing as viewed in FIG. 5. Conversely, if hydraulic fluid is admitted into the opposite end of the piston and cylinder assembly 117, the plate 110, and hence the bars 126, will move in the opposite direction. At the same time, the clevis 122, and hence the link 125, will be similarly moved.

The position of the plate 110, and hence the link 125, is controlled by the engagement of the ends of the bars 126 with an actuator 129, similar to the actuator 67 employed in the mechanical programmer of the previous embodiment. The actuator 129 like the actuator 67 controls a three-position servo valve 130, similar to the servo valve 60 of the previous embodiment. The valve 130 is spring loaded, which holds the valve 130 in a position which permits fluid to cause the assembly 117 to move the plate 110 in a direction which moves the bars 126 toward the actuator 129. When the end of a bar 126 strikes the actuator 129, it moves the valve 130 into a neutral position which stops the flow of oil to the assembly 117 and locks the piston 120 in the position reached at the time that the valve 130 is moved into the neutral position. When the valve 130 is moved further in the direction in which it is moved by the bars 126, as described hereinafter, it admits fluid under pressure into the end of the assembly 117 which causes the plate 110, and hence the bars 126, to move away from the actuator 129.

The actuator 129 is mounted on a shaft 131 of the valve 130, such shaft 131 being rotatable. The shaft 131 also carries a circular plate 132 engageable with a pair of switches 133 and 134 which may be used in a known manner for the purpose of assuring stepping of the actuator 129 from one bar 126 to the next bar 126, and for assuring that only one such step is made at a time. The actuator 129, and hence the shaft 131, are rotatable by an air cylinder assembly 135, similar to the air cylinder 80 of the previous embodiment, which is connected to the actuator 129 by a rod 136 and a clevis 137. When the air cylinder 135 is energized, it rotates the actuator 129 counterclockwise as viewed in FIG. 6, causing it to engage a cam surface 138, which moves the actuator 129 and the shaft 131 downwardly, as viewed in FIG. 5, causing the valve 130 to be moved into a position such that the assembly 117 moves the plate 110, and hence the bars 126, away from the actuator 129. Such rotation of the actuator 129 also causes the end 129a thereof, which normally engages the ends of the bars 126, to move into a position such that it no longer is engageable with the bars 126.

The valve 130, with its actuator 129, the air cylinder 135 and the switches 133 and 134 are all carried by a bracket 139 mounted on a threaded support 140 which is movable in the directions of the double-ended arrow 141 by means of a threaded rod 142 rotatably mounted on the base 143 and in threaded engagement with the support 140. The support 140 also slidably receives a pair of stationary guide rods 144 and 145 mounted from the base 143.

The rod 142 is rotatable by an air motor 146 which is connected to the rod 142 through a chain drive 147. A conventional impulse clutch assembly 148, comprising an actuating air cylinder 149 (FIG. 7), a stop 150 and a stop assembly 151, is also connected to the rod 142 by a chain drive 152. Thus, each time that the cylinder 149 is actuated the stop assembly 151 is released permitting one turn thereof and permitting the air motor 146 to rotate the rod 142. In the embodiment described herein, one turn of the assembly 151, through the drive 152, permits the rod 142 to rotate by three-quarters of a turn, and such amount of rotation of the rod 142 with the pitch of the thread on the rod 142 causes the support 140 to move the actuator 129 to the left as viewed in FIGS. 5 and 6 a distance slightly greater than the width of a bar 126. The air cylinder 149, and hence the stop assembly 151, are actuated, as described in further detail hereinafter, by the advance switch 76 (FIG. 1). The air motor 146 is reversible so that when the application of the ribbon 27 to the tire casing 14 is completed and the support 140 is at a position to the left, as viewed in FIGS. 5 and 6, the support 140 is returned to the extreme right, or "home" position, as shown in FIG. 5, by reversing the rotation of the rod 142 by the air motor 146, the stop assembly 151 not preventing or controlling such reverse revolution of the rod 142. A limit switch 155 is actuated by the support 140, or a part carried thereby, when the support 140 is returned to its "home" position.

With reference to FIG. 6, a stationary bracket 156 has a pair of limit switches thereon, the forward limit switch 157a being shown in FIG. 6, and such limit switches are actuable by a stop 158 which is movable with the piston rod 120, and hence with the bars 126. As described hereinafter, such limit switches are employed to limit the right and left movements, as viewed in FIG. 5, of the piston rod 120.

Figure 8:
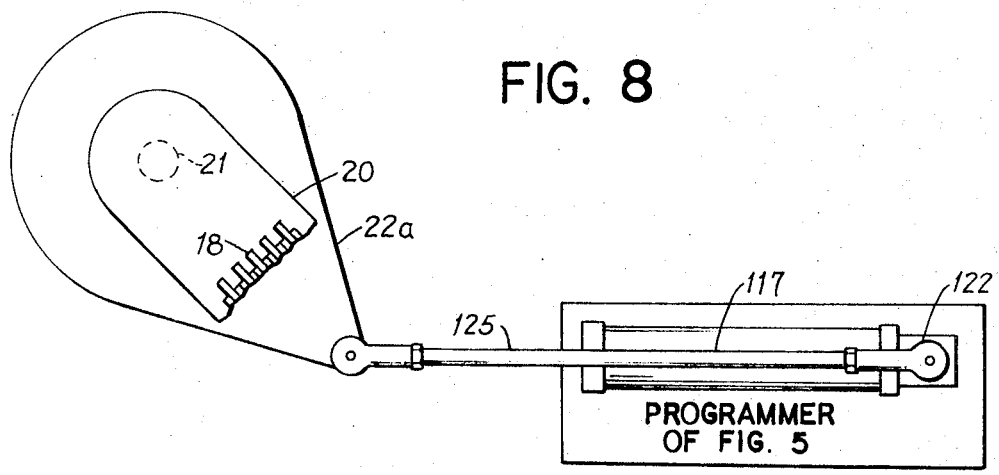
FIG. 8 is a fragmentary, plan view illustrating the connection of the alternative programmer to the azimuth column shown in FIGS. 1-3.

As illustrated in FIG. 8, the mechanical programmer illustrated in FIGS. 5-7 and described hereinbefore, may be substituted for the logic drum 61, shown in FIGS. 1-3, and its associated apparatus including the piston and cylinder assembly 56. Thus, the mechanical programmer illustrated in FIGS. 5-7 may be mounted on the carriage 42 with the clevis 122 connected to an arm of a member 22a by a link 125. The member 22a replaces the pulley 22 shown in FIGS. 1-3, and is connected to the azimuth column 20 so as to rotate it about the axis of the shaft 21. Accordingly each time that the clevis 122 is moved under control of the piston rod 120 which in turn, is controlled by the bars 126, the azimuth column 20 is rotated by an amount determined by the distance between the end of one bar 126 and the end of the next adjacent bar 126.

Figure 9:
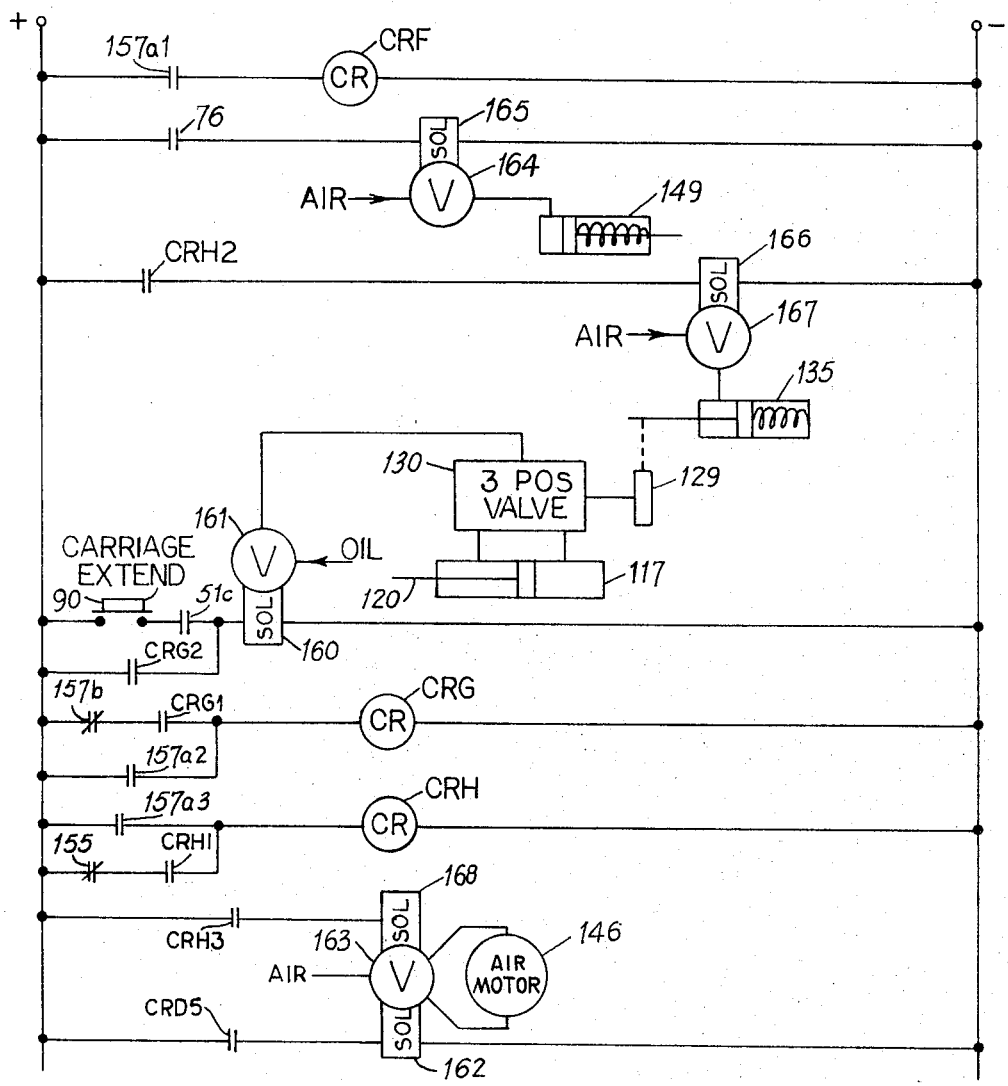
FIG. 9 is a combined, simplified, schematic diagram of the electrical and fluid controls associated with the alternative programmer.

FIG. 9 is a combined, simplified, schematic diagram of the electrical and fluid controls associated with the mechanical programmer illustrated in FIGS. 5-7, and is similar to FIG. 4 except that it omits most of the controls for the carriage 42, the extruder section 12 and the casing drive motor 91, the controls for such parts being as shown in FIG. 4. However, certain parts of such latter controls are repeated in FIG. 9 to assist in understanding the operation of the programmer described in connection with FIG. 9.

With reference to FIG. 9, and assuming that the various parts are in their "home" positions, the diagram of FIG. 9 may be understood from the following description:

(1) When the operator presses the carriage extend button 90, the casing 14 will assume its start position and the carriage 42 will move to its extend position as described hereinbefore.

(2) When the carriage 42 reaches its extended position, contacts 51c of the switch 51 (FIGS. 1-3) will close, energizing solenoid 160 of valve 161 which supplies oil under pressure to the three-position valve 130 (FIG. 5). If the actuator 129 is not moved to a neutral position by a bar 126 (FIG. 5), the piston and cylinder assembly 117 will move the bars 126 by means of the piston rod 120 until the actuator 129 is so moved, movement of the rod 120 causing movement of the azimuth column 20 to its start position.

(3) The operator then strings the ribbon 27 while operating the extruder as described hereinbefore.

(4) When the operator is ready to apply the ribbon 27 to the casing 14 and presses the start button 97 (FIG. 4), the contacts CRD5 (FIG. 9) of relay CRD (FIG. 4) energize the solenoid 162 of the reversing valve 163, which causes the air motor 146 to attempt to rotate in a direction which will cause the threaded rod 142 (FIG. 6) to rotate in a direction which will move the support 140 to the left, as viewed in FIG. 6. However, the rod 142 will not actually rotate until the impulse cylinder 149 has been actuated and such cylinder 149 is controlled by an air valve 164 having a solenoid 165. The solenoid 165 is energized by the advance switch 76 (FIG. 1) each time that the tire casing 14 rotates one revolution. Accordingly, each time that the switch 76 closes, the rod 142 is permitted to rotate by three-quarters of a turn and advance the support 140 to the left as viewed in FIG. 6 by a distance slightly greater than the width of a bar 126.

(5) When the support 140 moves to the left, as described in Paragraph (4) hereinbefore, the actuator 129 rides off the end of the bar 126 with which it was in contact, and the valve 130 moves to its position permitting the flow of oil into the piston and cylinder assembly 117 and causing movement of the piston rod 120, and hence the bars 126, until the next adjacent bar 126 engages the actuator 129 and moves the valve 130 into a neutral position.

(6) When the rod 120 moves a distance sufficient to actuate the switch 157a (FIG. 6), the contacts 157a1 thereof are closed, which energizes relay CRF (FIGS. 9 and 4) which, as described hereinbefore, opens the contacts of relay CRD, and hence the contacts CRD5, stopping the air motor 146.

(7) Contacts 157a2 of switch 157 also close, energizing relay CRG which locks up through its contacts CRG1 and the contacts of switch 157b which are closed when the piston rod 120 is away from its home position but which open when the piston rod 120 reaches its home position. Energization of the relay CRG causes the contacts CRG2 to close, which opens the valve 161. At the same time, contacts 157a3 of the switch 157a energize the relay CRH which locks up through its contacts CRH1 and the contacts of switch 155 (FIG. 5) which are open when the support 140 is in its home position and which are closed when the support 140 is away from its home position. Energization of the relay CRH causes closure of its contacts CRH2 which energizes solenoid 166 of the valve 167 which rotates the actuator 129 and by virtue of the engagement of the actuator 129 with the cam 138, the valve 130 is moved into a position such that the piston rod 120 is retracted or moved to the left as viewed in FIG. 5.

(8) When the piston rod 120 reaches its fully retracted position, the contacts of switch 157b are opened breaking the locking circuit for relay CRG and thereby closing the valve 161. When the support 140 reaches its home position and opens the contacts of the switch 155, the locking circuit for the relay CRH is opened thereby opening the contacts CRG2 and releasing the air cylinder 135 which permits the actuator 129 to return to its normal or vertical position, it will permit the valve 130 to assume either a neutral position in engagement with the end of a bar 126, or a position in which the piston rod 120 will move to the right as viewed in FIG. 5 when the valve 161 is opened.

(9) While relay CRG was energized, its contacts CRH3 closed a circuit for the solenoid 168 of the valve 163 which caused the air motor 146 to operate in a reverse direction and to rotate the rod 142 in the reverse direction thereby returning the support 140 to its home position in which it actuates the switch 155. Rotation of the rod 142 is not restrained in the reverse direction by the stop assembly 151.

(10) It will be observed that by reason of the foregoing, both the bars 126 and the support 140 are returned to their home positions ready for the next cycle of operations, and such return of the bars 126 and the support 140 occurs in the absence of manual intervention by the operator. However, while such return of the bars 126 and the support 140 is occurring, or thereafter, the operator may retract the carriage 42 as described hereinbefore.

Although the mechanical programmers have been described as having various limit switches in specified positions, it will be apparent to those skilled in the art that the limit switches may be otherwise disposed, e.g., the limit switches for controlling the position of the rod 120 could be disposed so as to be actuated by the control column 20. Similarly, although it is preferred to accomplish the relative movement in transverse directions between the control valve, 60 or 130, and the camming members, 66 or 126, by moving one in one direction and the other in a transverse direction, it will be apparent to those skilled in the art that one may be maintained stationary and the other may be moved in the two directions. Also, although the advance switch 76 is shown as actuated by the mounting means for the tire casing 14 which will cause the switch 76 to be actuated at predetermined times in the rotation of the casing 14, and hence, when predetermined lengths of the ribbon 27 have been applied thereto, it will be apparent to those skilled in the art that it may be differently located and actuated by the tire casing 14 itself or by part of the ribbon applying apparatus, e.g., dependent upon the length of ribbon 27 passing therethrough.

The invention has been described as employing the mechanical programmer of the invention for the control of the azimuth position of the control column which supports the application rollers, but it will be apparent to those skilled in the art that the azimuth column may be maintained stationary in azimuth and the mechanical programmer may be used to control the azimuth orientation of the tire casing 14 around a vertical axis in the plane of rotation of the tire casing 14, e.g., as a replacement for the programmer in the prior art patents cited hereinbefore.

Although preferred embodiments of the present invention have been described and illustrated, it will be apparent to those skilled in the art that various modifications may be made without departing from the principles of the invention.

What is claimed is:

1. In tire building apparatus having tire casing rotating means for rotating a tire casing in its plane, having ribbon applying means for applying an elastomeric ribbon to said casing as it is rotated and having mounting means for one of said rotating and applying means for rotating said one means around an axis substantially parallel to said plane, the combination therewith of second rotating means and programming means for controlling the azimuth position of said one means with respect to said axis, said second rotating means comprising reversible driving means connected to said mounting means for rotating said mounting means and hence, said one means, around said axis, and control means connected to said driving means for controlling the movement thereof, and said programming means comprising a plurality of spaced camming members engageable with said control means for actuating the latter and thereby causing movement of said driving means, moving means connected to at least one of said programming means and control means for producing relative movement in two transverse directions between said control means and said camming members for engaging successive ones of said camming members with said control means and stepping means operable by one of said casing rotating means, said applying means and said tire casing as said ribbon is applied to said casing and connected to said moving means for causing said relative movement as predetermined lengths of said ribbon are applied to said casing.

2. Apparatus as set forth in claim 1, wherein said driving means comprises a hydraulic piston and cylinder assembly and said control means comprises reversible hydraulic valve means connected to the cylinder of said assembly for supplying fluid under pressure thereto and moving the piston of said assembly with respect to said cylinder in either of two directions.

3. Apparatus as set forth in claim 2, wherein said applying means is said one means and said mounting means comprises an arm to which one of said piston and said cylinder is connected.

4. Apparatus as set forth in claim 3 further comprising a carriage mounted for movement toward and away from said tire casing rotating means in a direction substantially parallel to said plane and wherein said applying means, said second rotating means and said programming means are mounted on said carriage.

5. Apparatus as set forth in claim 2, wherein said valve means comprises an actuator, said programming means comprises a rotatable logic drum with said camming members disposed circumferentially and axially thereof and said moving means comprises valve mounting means slidably mounting said valve means, and connected to said hydraulic piston and cylinder assembly for moving said valve mounting means in a direction substantially parallel to the axis of said logic drum and said actuator into engagement with said camming members, and means for rotating said drum stepwise in response to operation of said stepping means.

6. Apparatus as set forth in claim 5, wherein said logic drum comprises a plurality of rods spaced radially from the axis of said drum, extending axially of said drum and spaced circumferentially of said drum and wherein said camming members are lugs adjustably mounted on said rods.

7. Apparatus as set forth in claim 5, wherein said mounting means for said first-mentioned one means comprises a rotatable member connected to said first-mentioned one means for rotating the latter and said driving means comprises drive means interconnecting said piston and cylinder assembly and said rotatable member for rotating the latter upon actuation of said assembly.

8. Apparatus as set forth in claim 7, wherein said rotatable member comprises a pulley and said drive means comprises a belt extending around said pulley and connected to said valve mounting means.

9. Apparatus as set forth in claim 7, wherein said applying means is said first-mentioned one means.

10. Apparatus as set forth in claim 2. wherein said valve means comprises an actuator, said moving means comprises first mounting means carrying said camming members and movable along a first path extending in a predetermined direction, second mounting means carrying said valve and movable along a second path extending transversely to said predetermined direction and intersecting said first path to cause engagement of said actuator with said camming members and said stepping means comprises means for moving said second mounting means stepwise along said second path.

11. Apparatus as set forth in claim 10, wherein said camming members are a plurality of bars adjustably mounted on said first mounting means and which extend parallel to each other and in said predetermined direction and are adjustable in said predetermined direction.

12. Apparatus as set forth in claim 10 further comprising means interconnecting said piston and cylinder assembly and said first mounting means for causing movement of the latter along said first path by said assembly.

13. Apparatus as set forth in claim 10, wherein said applying means is said first-mentioned one means.

14. Apparatus as set forth in claim 1 further comprising means operable by one of said first-mentioned mounting means, said driving means and said moving means when said first-mentioned mounting means has been rotated to a predetermined azimuth position for moving said programming means, said control means and said driving means to predetermined relative positions.

15. In tire building apparatus having tire casing rotating means for rotating a tire casing in its plane, having ribbon applying means for applying an elastomeric ribbon to said casing as it is rotated, said applying means comprising an azimuth column rotatable around an axis substantially parallel to said plane and application rollers mounted on said column in offset relation to said axis for receiving said ribbon and applying it to a surface of said casing, mounting means for said column for rotating it around said axis and means for supplying said ribbon to said application rollers, the combination therewith of a fluid operable and reversible piston and cylinder assembly, first connecting means connecting said assembly to said mounting means for rotating said column when fluid under pressure is supplied to said assembly, reversible fluid control valve means connected to said assembly for controlling the supply of fluid thereto and the direction of actuation thereof, said valve means having an actuator, first mounting means carrying said valve means and mounted for movement along a first path extending in a predetermined direction, a mechanical programmer for directing the actuation of said actuator and hence, the actuation of said assembly and the azimuth position of said column, comprising a plurality of camming members and second mounting means carrying said camming members and mounted for movement along a second path extending transversely to said first path, whereby said members are individually engageable with said actuator, said camming members being mounted in spaced relation to each other and being spaced in a direction extending away from said actuator, second connecting means connecting one of said first and second mounting means to said assembly for movement thereby when said fluid is supplied thereto, control means operable by one of said casing rotating means, said applying means and said tire casing as predetermined lengths of said ribbon are applied to said casing, and stepwise driving means connected to said control means and to the other of said first and second mounting means for moving said other mounting means along its path each time said control means is operated and for thereby moving said actuator out of engagement with one camming member and into a position where it is engageable with another camming member upon movement of said one mounting means along its path.

16. Apparatus as set forth in claim 15, wherein said first mounting means carrying said valve means is said one mounting means, and said second mounting means is a rotatable logic drum with its axis of rotation substantially parallel to said first path, said camming members being mounted on said drum in circumferentially and axially spaced relation and said stepwise driving means comprises means for rotating said drum by an amount substantially equal to the circumferential spacing between camming members each time said control means is operated.

17. Apparatus as set forth in claim 16 further comprising fluid operable piston and cylinder means connected to said actuator for moving the latter out of the path of said camming members and for moving said valve means into a position in which said assembly moves said actuator away from said camming members.

18. Apparatus as set forth in claim 17 further comprising limit means connected to said piston and cylinder means and to said stepwise driving means for causing said piston and cylinder means and said stepwise driving means to move said first mounting means and said drum respectively into predetermined home positions and co-operating means controlled in accordance with the position of one of said drum and said first mounting means for operating said limit means when said drum and said first mounting means have a predetermined positional relation.

19. Apparatus as set forth in claim 15, wherein said second mounting means carrying said camming members is said one mounting means, said camming members are a plurality of relatively long and narrow bars mounted with their lengths extending in the direction of said second path and with their ends spaced from each other in said last-mentioned direction and said first mounting means is a support which is movable along said first path, the latter being substantially perpendicular to said second path, and said stepwise driving means comprises means for moving said first mounting means along said first path by an amount at least equal to the distance between corresponding points on said ends of said bars each time said control means is operated.

20. Apparatus as set forth in claim 19 further comprising fluid operable piston and cylinder means connected to said actuator for moving the latter out of the path of said camming members and for moving said valve means into a position in which said assembly moves said camming members away from said actuator.

21. Apparatus as set forth in claim 20 further comprising limit means connected to said piston and cylinder means and to said stepwise driving means for causing said piston and cylinder means and said stepwise driving means to move said second mounting means and said support respectively into predetermined home positions and co-operating means controlled in accordance with the position of one of said support and said second mounting means for operating said limit means when said support and said second mounting means have a predetermined positional relation.

References Cited
UNITED STATES PATENTS

| | | | |
|---|---|---|---|
| 3,251,722 | 5/1966 | Holman | 156—130 |
| 3,308,000 | 3/1967 | Holman | 156—397 |
| 3,726,736 | 4/1973 | Wolfenden | 156—360 |
| 3,069,860 | 12/1962 | Colchagoff et al. | 91—36 |
| 3,286,599 | 11/1966 | Evans | 91—36 |
| 3,379,099 | 4/1968 | Missioux | 91—36 |
| 3,549,442 | 12/1970 | Hineline | 156—117 |
| 3,418,191 | 12/1968 | Dieckmann et al. | 156—130 |
| 3,177,918 | 4/1965 | Holman | 156—96 |
| 3,497,408 | 2/1970 | Hineline | 156—130 |

CLIFTON B. COSBY, Primary Examiner

J. E. KITTLE, Assistant Examiner

U.S. Cl. X.R.

156—96, 117, 130, 187, 366, 394, 397; 91—35